US011521104B2

United States Patent
Delfosse et al.

(10) Patent No.: US 11,521,104 B2
(45) Date of Patent: Dec. 6, 2022

(54) QUANTUM ERROR CORRECTION WITH REALISTIC MEASUREMENT DATA

(71) Applicant: Microsoft Technology Licensing, LLC, Redmond, WA (US)

(72) Inventors: Nicolas Guillaume Delfosse, Bellevue, WA (US); Christopher Anand Pattison, Pasadena, CA (US); Michael Beverland, Seattle, WA (US); Marcus Palmer Da Silva, Redmond, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 0 days.

(21) Appl. No.: 17/179,625

(22) Filed: Feb. 19, 2021

(65) Prior Publication Data
US 2022/0269963 A1     Aug. 25, 2022

(51) Int. Cl.
*G06N 10/00* (2022.01)
*G06F 11/10* (2006.01)
*G06F 11/00* (2006.01)
*G06F 16/901* (2019.01)

(52) U.S. Cl.
CPC ......... *G06N 10/00* (2019.01); *G06F 11/1048* (2013.01); *G06F 16/9024* (2019.01)

(58) Field of Classification Search
CPC .. G06N 10/00; G06F 16/9024; G06F 11/1048
See application file for complete search history.

(56) References Cited

U.S. PATENT DOCUMENTS

| | | | | |
|---|---|---|---|---|
| 10,755,193 | B2 * | 8/2020 | Kandala | G06N 10/00 |
| 11,263,076 | B2 * | 3/2022 | Nickerson | G06N 10/00 |
| 2006/0224547 | A1 * | 10/2006 | Ulyanov | B82Y 10/00 |
| | | | | 706/62 |
| 2021/0124640 | A1 * | 4/2021 | Nickerson | G06F 11/10 |
| 2021/0125096 | A1 * | 4/2021 | Puri | G06N 10/40 |
| 2021/0194507 | A1 * | 6/2021 | Delfosse | H03M 13/1575 |
| 2021/0232963 | A1 * | 7/2021 | Gimeno-Segovia | G06N 10/40 |
| 2021/0279627 | A1 * | 9/2021 | Bauer | G06N 10/70 |
| 2021/0391873 | A1 * | 12/2021 | Zheng | G06N 10/00 |
| 2021/0399743 | A1 * | 12/2021 | Zheng | H03M 13/1575 |

FOREIGN PATENT DOCUMENTS

EP          3005572 B1      8/2017

OTHER PUBLICATIONS

Bombin, et al., "Topological quantum distillation", In Journal of Physical Review Letters, vol. 97, Issue 18, Oct. 1, 2006, 4 Pages.
(Continued)

*Primary Examiner* — Justin R Knapp
(74) *Attorney, Agent, or Firm* — Holzer Patel Drennan

(57) ABSTRACT

A quantum computing system computes soft information quantifying an effect of soft noise on multiple rounds of a syndrome measurement that is output by a quantum measurement circuit. The soft noise arises due to imperfections in a readout device that introduce variability in repeated measurements of ancilla qubits and is distinct from quantum noise arising from bit-flips in data qubits that are indirectly measured by the ancilla qubits. The quantum computing system applying decoding logic to identify fault locations within the quantum measurement circuit based on the computed soft information.

20 Claims, 7 Drawing Sheets

(56) References Cited

OTHER PUBLICATIONS

Bravyi, et al., "Correcting Coherent Errors with Surface Codes", In Journal of npj Quantum Information, vol. 4, issue 1, Oct. 31, 2018, 6 Pages.
Chao, et al., "Optimization of the Surface Code Design for Majorana-based Qubits", In Journal of Quantum, vol. 1, Oct. 28, 2020, 19 Pages.
Cook, et al., "Computing Minimum-Weight Perfect Matchings", In INFORMS Journal on Computing, vol. 11, Issue 2, May 1999, pp. 138-148.
Costello, et al., "Channel coding: The road to channel capacity", In Journal of Proceedings of the IEEE, vol. 95, Issue 6, Jun. 2007, pp. 1150-1177.
Delfosse, et al., "Almost-Linear Time Decoding Algorithm for Topological Codes", In Repository of arXiv:1709.06218, Sep. 19, 2017, 10 Pages.
Delfosse, Nicolas, "Decoding Color Codes by Projection onto Surface Codes", In Journal of Physical Review A, vol. 89, Issue 1, Jan. 2014, 24 Pages.
Dennis, et al., "Topological Quantum Memory", In Journal of Mathematical Physics, vol. 43, Issue 9, Sep. 2002, pp. 4452-4505.
Edmonds, Jack, "Paths, Trees, and Flowers", In Canadian Journal of Mathematics, vol. 17, 1965, pp. 449-467.
Fowler, et al., "High-Threshold Universal Quantum Computation on the Surface Code", In Journal of Physical Review A, vol. 80, Issue 5, Nov. 11, 2009, 18 Pages.
Huang, et al., "Fault-Tolerant Weighted Union-Find Decoding on the Toric Code", In Journal of Physical Review A, vol. 102, Issue 1, Jul. 16, 2020, 6 Pages.
Karzig, et al., "Scalable Designs for Quasiparticle-Poisoning-Protected Topological Quantum Computation with Majorana zero Modes", In Journal of Physical Review B, vol. 95, Issue 23, Jun. 21, 2017, 32 Pages.
Kitaev, A. Yu., "Fault-Tolerant Quantum Computation by Anyons", In Journal of Annals of Physics, vol. 303, issue 1, Jan. 2003, 29 Pages.
Knapp, et al., "Modeling Noise and Error Correction for Majorana-based Quantum Computing", In Journal of Quantum, vol. 2, Aug. 27, 2018, 36 Pages.
Kolmogorov, Vladimir, "Blossom V: a new implementation of a minimum cost perfect matching algorithm", In Journal of Mathematical Programming Computation, vol. 1, Issue 1, Jul. 2009, pp. 43-67.
Mackay, et al., "Sparse-Graph Codes for Quantum Error Correction", In Journal of IEEE Transactions on Information Theory, vol. 50, Issue 10, Oct. 2004, pp. 2315-2330.
Poulin, David, "Optimal and Efficient Decoding of Concatenated Quantum Block Codes", In Journal of Physical Review A, vol. 74, Issue 5, Nov. 2006, 6 Pages.
Raussendorf, et al., "Fault-Tolerant Quantum Computation with High Threshold in Two Dimensions", In Journal of Physical Review Letters, vol. 98, Issue 19, May 11, 2007, 4 Pages.
Tillich et al., "Quantum LDPC Codes With Positive Rate and Minimum Distance Proportional to the Square Root of the Blocklength", In Journal of IEEE Transactions on Information Theory, vol. 60, Issue 2, Feb. 2014, pp. 1193-1202.
Vazirani, Vijay V., "A theory of alternating paths and blossoms for proving correctness of the $O(V\text{--}\sqrt{E})$ general graph maximum matching algorithm", In Journal of Combinatorica, vol. 14, Issue 1, Mar. 1994, pp. 71-109.
Wang et al., "Soft Information for LDPC Decoding in Flash: Mutual-Information Optimized Quantization", In Proceeding of IEEE Global Telecommunications Conference—GLOBECOM, Dec. 5, 2011, 6 Pages.
Zemor, Gilles, "On Cayley Graphs, Surface Codes, and the Limits of Homological Coding for Quantum Error Correction", In Proceedings of International Conference on Coding and Cryptology, Jun. 2009, pp. 259-273.
Bolt, et al., "Decoding Schemes for Foliated Sparse Quantum Error Correcting Codes", In Repository of arXiv:1810 11572v1, Oct. 27, 2018, 23 Pages.
D'Anjou, B., "A Generalized Figure of Merit for Qubit Readout", In Repository of arXiv:2008.08630v2, Jan. 22, 2021, 17 Pages.
Fukui, et al., "High-Threshold Fault-Tolerant Quantum Computation with Analog Quantum Error Correction", In Repository of arXiv:1712.00294v3, Mar. 6, 2018, 14 Pages.
"International Search Report and Written Opinion Issued in PCT Application No. PCT/US2021/053579", dated Feb. 11, 2022, 5 Pages.

\* cited by examiner

Decoding Graph for Three Syndrome Measurement Rounds

QUANTUM ERROR CORRECTION WITH REALISTIC MEASUREMENT DATA

BACKGROUND

The scalability of decoders for quantum error correction is an ongoing challenge in generating practical quantum computing devices. Hundreds or thousands of high-quality qubits with a very low error rate (e.g., $10^{-10}$ or lower) may be needed to implement quantum algorithms with industrial applications. Due to the high noise rate of quantum hardware, extensive quantum error corrections necessary in the design of a large scale quantum computer. One of the most popular quantum error correction schemes for fault-tolerant computing is the surface code because it is easy to implement on a grid of qubits using only logical gates and because it tolerates high error rates. Numerical simulations show that the surface code achieves a good performance for a variety of noise models, even when implemented with noisy quantum gates or in the presence of coherent errors. However, the noise model for the surface code is generally very simplistic. While schemes have been devised to account for quantum noise (e.g., bit flips or phase flips on data qubits), existing noise models do not propose any solution that accounts for analog classical noise on the measurement outcome that arises due to imperfections in the readout device.

SUMMARY

According to one implementation, a system includes a soft information computation engine computes soft information quantifying an effect of soft noise on multiple rounds of a syndrome measurement output by a quantum measurement circuit. The soft noise is noise arising from imperfections in a readout device and/or limited measurement time introducing variability in repeated measurements of ancilla qubits. A decoding unit uses the computed soft information to identify fault locations that collectively explain the measured syndrome This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

The herein disclosed technology provides a noise model and decoder that uses the noise model to correct errors detected in a qubit register of a quantum computer. Unlike other decoding solutions, the disclosed design implements corrections that account for both quantum noise and classical noise, yielding a higher error correction capability and better performance than currently-competing decoders. In quantum computing, "quantum noise" refers to noise that can flip the state of the system, resulting in a flip of the outcome that is measured by a readout device. Classical noise (also referred to herein as "soft noise"), in contrast, refers to noise that arises due to imperfections in the readout device and/or limited time for sampling the measurement from the readout device. In a quantum device, soft noise introduces variability in repeated measurements of ancilla qubits.

This noise arises in the measurement of the quantum outcome rather than in the underlying state of qubits captured by the measurement and is, in most all quantum systems, widely ignored.

Flash memory devices provide an on-point example of how classical noise can impact a readout device. In flash memory, each flash cell is programmed to store a voltage state that may be directly interpreted as representing one or more bits of data. For example, in a multi-level cell in flash memory may be programmed to stored one of four voltage states, each representing one of the binary states: 11, 10, 01, and 00. Due to imperfections in the readout hardware of flash memory devices, actual voltages stored in each flash cell may vary slightly around the targeted value. When, for example, a flash cell read operation returns a voltage that is somewhere between the voltage representing two distinct states (e.g., binary state '11' and '01'), the device must implement logic to select the binary state that most accurately corresponds to the stored volage. Flash memory devices typically employ classical error correction code to implement this logic.

Like flash memory, imperfections of a quantum read-out device can also impact the interpretation of the measured outcome. However, there exists a stark difference between the classical (flash memory) and quantum applications that severely complicate and limit the efficacy of classical error correction at the quantum level. These differences arise from the fact that flash memory permits a direct measurement of the encoded data within each cell. In contrast, data qubits cannot be directly measured in quantum applications without destroying the underlying data. For this reason, quantum readout devices perform indirect measurements (e.g., typically, by entangling a group of data qubits with an ancilla qubit and measuring the ancilla qubit to infer the parity of the entangled data qubits). As a consequence of the above, existing classical corrections that account for read-out device error do not work for quantum applications.

Figure 1:
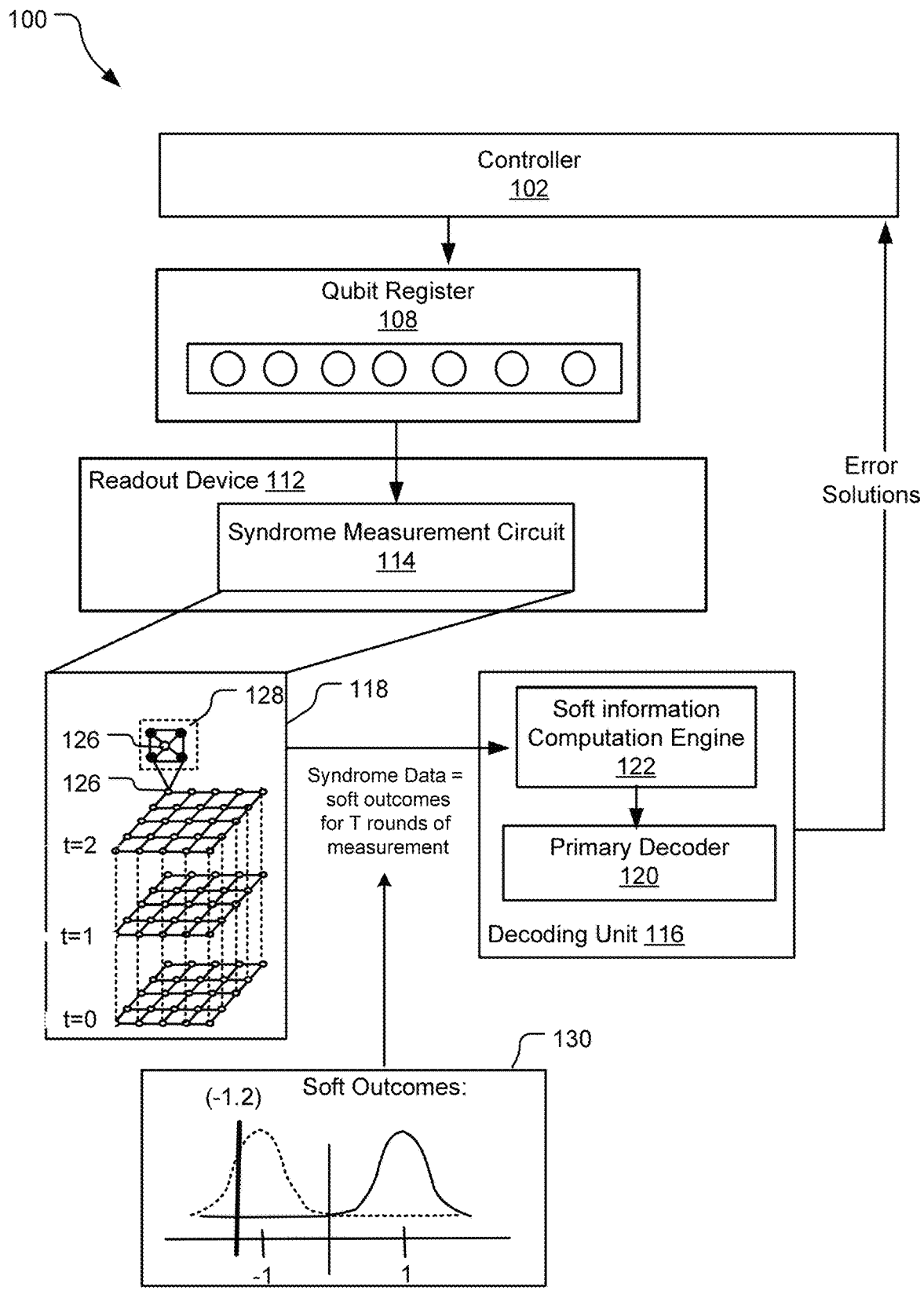
FIG. 1 illustrates an example quantum computing system that utilizes soft outcomes from quantum measurements to perform error detection and correction.

The herein disclosed systems provide quantum device corrections that account for classical Gaussian noise in a readout device that shifts the outcome of a measurement by a random variable with normal distribution. According to one implementation, the disclosed decoding solutions receive and interpret quantum measurements using "soft" outcome data rather than the traditionally-used "hard" outcome data. As used herein, the term "hard outcome" refers to a binary value (e.g., 1/0) whereas a "soft outcome" refers to a real (non-binary) number. According to one implementation of the herein disclosed technology, a quantum readout device measures soft outcomes, where each soft outcome is a real number measurement 'o' sampled from any pair of probability distributions describing classical noise, where one of the distributions is associated with the outcome +1 and the other is associated with the outcome -1. In the example of FIG. 1 (discussed below), the outcomes are shown to be Gaussian but these outcomes can also be non-Gaussian distributions. Traditional quantum devices discard this soft value by immediately mapping soft outcomes to hard (binary) outcomes. For example, -1.2 may be mapped to '-1' while +0.8 may be mapped to 1, where -1/1 are then represented as binary digits. This type of mapping discards data that may have meaningful application in error correction. The following methodologies propose novel models that allow for this soft outcome data to be used in quantum error correct, ultimately improving detector performance.

FIG. 1 illustrates an example quantum computing system 100 that utilizes soft outcomes from quantum measurements to perform error detection and correction. The system includes a decoding unit 116 that includes a sub-engine referred to herein as a soft information computation engine 122. The soft information computation engine 122 uses soft measurement outcomes (discussed below) to compute various metrics that are provided as an input to a primary decoder 120. The primary decoder 120 may implement logic typical of any standard decoder whose role is to identify the error affecting qubits and correct the resulting error. By example and without limitation, the primary decoder 120 may implement logic utilized by decoders such as the Minimum Weight Perfect Matching (MWPW) Decoder, the Union-Find (UF) Decoder, as well as other machine learning decoders or tensor network decoders. Notably, the primary decoder 120 differs from traditional implementations in that it accepts soft inputs (e.g., metrics computed by the soft information computation engine 122) in lieu of hard inputs that are used in traditional applications. This yields increased decoding performance.

The quantum computing system 100 includes a controller 102 that performs calculations by manipulating qubits within a qubit register 108. To enable fault tolerant quantum computation in the quantum computing system 100, a readout device 112 includes a syndrome measurement circuit 114 that applies quantum error correction code(s) (QECCs) to data read out from the qubit register 108 by the readout device 112. QECCs have been developed to protect quantum states from quantum noise during measurement. In any QECC, logical qubits are encoded using several physical qubits to enable fault tolerant quantum computations Since measurement is known to destroy the delicate states of a qubit needed for computation, the syndrome measurement circuit 114 uses redundant qubits—known as "ancilla data bits" to perform computations. During quantum processing, entropy from the data qubits that encode the protected data is transferred to the ancilla qubits (sometimes also referred to as "measurement qubits") that can be discarded. The ancilla qubits are positioned to interact with data qubits such that it is possible to detect errors by measuring the ancilla qubits and to correct such errors using a decoding unit 116 that includes one or more decoders. In some implementations, the decoding unit 116 includes logic executed by one or more classical computing systems.

The syndrome measurement circuit 114 performs measurements of the ancilla bits in the quantum computer to extract syndromes providing information measured with respect to quantum errors (faults). In order to avoid accumulation of errors during the quantum computation, the syndrome data is constantly measured, producing r syndrome bits for each syndrome measurement round. By example and without limitation, view 118 provides a visualization of three rounds of syndrome measurement data (e.g., at times t=0, t=1, and t=2). At each round, a measurement is performed on a number of ancilla qubits represented as open circles (e.g., an ancilla qubit 126) on a 2D grid. Each of the ancilla qubits encodes the parity state of a set of group of entangled neighboring data qubits. This concept is roughly illustrated by view 128, illustrating the ancilla qubit 126 that encodes a parity state of four neighboring data qubits (shown as filled black circles). Although each of the ancilla qubits may be similarly understood as encoding parity data of neighboring data qubits, the data qubits are omitted from the remainder of view 118 for simplicity. Thus, the open circles all represent ancilla qubits.

At each of rounds t-0, t=1,and t=2, the ancilla qubits are measured and the resulting data is read out by the readout device 112 as an array referred to herein as a "syndrome" that includes outcome values for each round of measurement. Notably, the data bits of the syndrome are read out and provided to the decoding unit 116 as soft outcomes (real number values).

When the state of an ancilla qubit (e.g., ancilla qubit 126) is physically measured, the measurement produces one of two different basis states $|0\rangle$ and $|1\rangle$. This information may be conveyed in different forms, depending on the specific quantum architecture used to implement the individual qubits. In one implementation, the readout device 112 is designed to generate outcome data corresponding to binary values or other integer values easily mapped to binary, such as -1 and 1. Due to imperfections in the readout device 112 and limits on measurement time for sampling each round of syndrome measurement, the actual values returned by the readout device 112 have some natural probabilistic variation centered around these target outcomes, as illustrated by view 130.

Specifically, view 130 shows a first distribution 132 of soft outcomes centered at integer value -1 and a second distribution 134 of soft outcomes centered at integer value 1. Stated differently, actual values returned by the readout device 112 are "soft values" that fall within distributions centered at each integer value (-1, 1), corresponding to hard outcomes of 0 and 1, respectively. For example, a real outcome ("soft outcome") may be -1.2 rather than -1, as shown. The two distributions 132, 134 may be understood as having integrals of equal value and as being Gaussian distributions (as shown) or distributions of any family of classical distribution (e.g., any non-gaussian type of classical distribution) .The first distribution 132 and the second distribution 134 can be the same or different from one another and/or have different parameters. For example, one distribution can be Gaussian and one Poisson, both Gaussian with different variance σ and σ', etc. The two distributions representing the range of soft outcomes may vary with time and may depend on the state of the qubit being measured.

In traditional quantum applications, soft outcome values are immediately mapped by the decoding unit 116 to a hard outcome value using a naive approximation: ô=sign(o), where o is the soft outcome value. Per this mapping the soft outcome data is discarded and analysis of the decoding unit 116 hinges instead on the hard outcome data. For example, the soft outcome -1.2 is mapped to the hard outcome -1, and the soft outcome +0.4 is mapped to the hard outcome value of 1.0. In the presently disclosed technology, however, the syndrome at each measurement round is provided in the form of a soft outcome vector that includes the soft measurement for each ancilla qubit in the readout device 112. This is repeated over multiple measurement rounds, as shown.

The multiple rounds of syndrome data are provided to the soft information computation engine 122, which computes further metrics using the soft data including "soft edge weights," which are discussed in greater detail below with respect to FIGS. 4-6. According to one implementation, the soft information computation engine 122 applies a novel graphical model for "soft noise" with continuous outcomes. The term "soft noise" is used interchangeably herein with "classical noise" to refer to noise that arises due to imperfections in the readout device and/or limits on measurement time for performing the measurements of the measurement device. In a quantum device, soft noise introduces variability in repeated measurements of ancilla qubits and is distinct from quantum noise arising from bit-flips in data qubits that are indirectly measured by the ancilla qubits.

Soft noise metrics based on this noise model may be used by the primary decoder 120 in lieu of or in addition to traditionally-used "hard outcome" inputs to improve detector performance. The primary decoder 120 outputs error solution information that identifies fault locations (e.g., locations of quantum bit-flips) within the readout device 112 that allows the controller 102 to perform error correction.

Figure 2A:
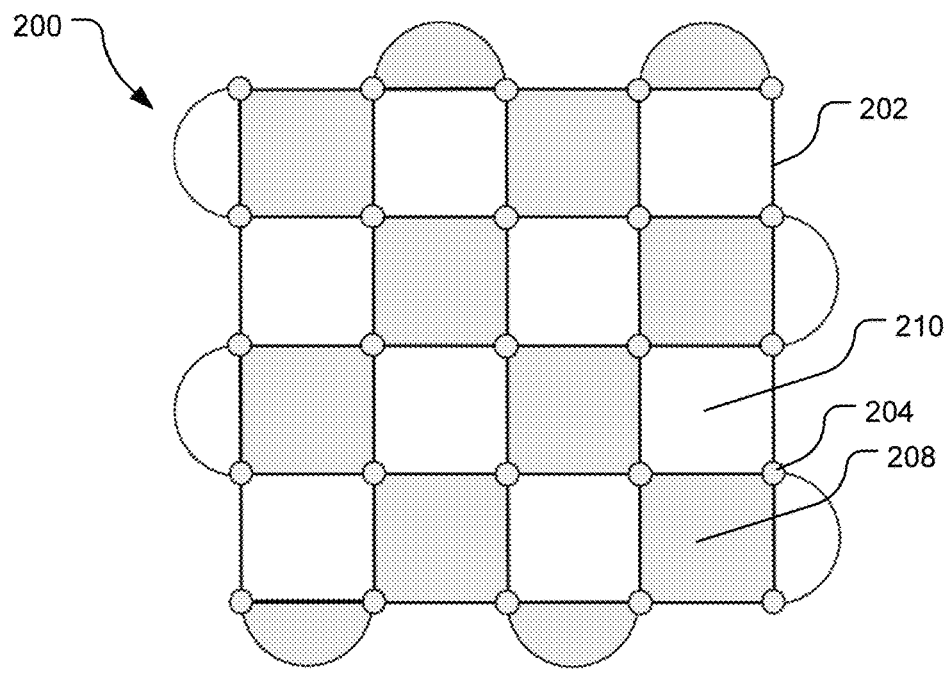
FIG. 2A illustrates an example portion of a syndrome measurement circuit that employs surface code to provide syndrome data to a decoding unit in a quantum computing device.

FIG. 2A illustrates example portions of a syndrome measurement circuit 200 that employs surface code to provide syndrome data to a decoding unit in a quantum computing device. The syndrome measurement circuit 200 may be integrated within a quantum computing system to provide soft outcome syndrome data to a primary decoder, such as decoder 120 as discussed with respect to FIG. 1.

In the surface code, physical qubits are entangled together using a sequence of physical qubit CNOT operations, with subsequent measurements of the entangled states providing a means for error correction and error detection. A set of physical qubits entangled in this way is used to define a logical qubit, which due to the entanglement and measurement has far better performance than the underlying physical qubits.

In FIG. 2A, the syndrome measurement circuit 200 encodes a single logical qubit onto a square grid 202 of dxd data qubits, where d is referred to as the minimum distance of the surface code. In the example of FIG. 2A, the grid 202 represents a two-dimensional distance-3 surface code. In the simplest realization, a surface code of distance d uses $(2d-1)^2$ qubits to store a single logical qubit, where d is a measure of redundancy and error tolerance. A larger code distance results in greater redundancy and increased error tolerance. Thus, the square grid 202 shown may be understood as representing a single logical qubit that is one of many different logical qubits measured by the syndrome measurement circuit 200 in the quantum computing system.

In the particular representation shown in FIG. 2A, data qubits are shown by hollow circles on vertices of the grid (e.g., a data qubit 204). Although not shown, the face of each plaquette (e.g., a square plaquette 208) may be understood as including an ancilla qubit that is coupled to each of the data qubits at the four corners of the plaquette. Error correction is based on the measurement of $r=d^2-1$ syndrome bits that are extracted from a qubit register by the syndrome measurement circuit 200.

In the syndrome measurement circuit 200 of FIG. 2A, data qubit errors (e.g., quantum noise) can be modeled by introducing random X bit-flip and Z phase-flip operations in the evolution of the qubit state where X and Z are the Pauli X-gate and the Pauli Z-gate, respectively. Note, the Pauli-Y gate is the combination $\hat{Y}=\hat{X}\hat{Z}$, and is thus usable to model a combined bit flip error and phase flip error. The operator model for correcting single-qubit errors implies that these errors can, in principle, by undone by applying the X and Z correction gates (e.g., an erroneous Z-type error can be canceled by subsequently applying an intentional $\hat{Z}$, since $\hat{Z}^2=\hat{I}$ (the identity matrix).

The syndrome measurement circuit 200 utilizes two types of ancilla qubits referred to herein respectively as "measure-Z" qubits (centered on plaquettes with shaded faces, such as shaded plaquette 208) and "measure-X" qubits (centered on plaquettes with unshaded faces, such as unshaded plaquette 210). In surface code literature, the measure-Z and measure-X qubits are sometimes called Z syndrome and X syndrome qubits. In the surface code configuration of FIG. 2, each measure-X and measure-Z qubit is coupled to four data qubits (e.g., the four nearest hollow circles). Further, each data qubit is coupled to two measure-Z qubits and two measure-X qubits (e.g., the four nearest solid filled circles). A measure-Z qubit is used to force is used to force its neighboring data qubits a, b, c, and d into an eigenstate of the operator product $\hat{Z}_a, \hat{Z}_b, \hat{Z}_c, \hat{Z}_d$. Likewise, a measure-X qubit is used to force is used to force its neighboring data qubits a, b, c, and d into an eigenstate of the operator product $\hat{X}_a, \hat{X}_b, \hat{X}_c, \hat{X}_d$. Each measure-Z qubit therefore measures what is known as a Z-stabilizer and each measure-X qubit measures what is known as an X-stabilizer. Stabilizers (e.g., the X-stabilizer and the Z-stabilizer) are very important in preserving quantum states. By repeatedly measuring a quantum system using a complete set of commuting stabilizers, the syndrome measurement circuit 200 forces the data bits associated with each measure-X and measure-Z qubit into a simultaneous and unique eigenstate of all of the stabilizers allowing one to measure the stabilizers without perturbing the system. When the measurement outcomes change, this corresponds to one or more qubit errors and the quantum state is projected by the measurements onto a different stabilizer eigenstate.

The measurement of each ancilla qubit (the measure-Z and measure-X qubits) is performed by implementing a sequence of operations in a very particular order that is effective to entangle the ancilla qubit on the face of each plaquette with its four nearest-neighbor data qubits. The last step in this sequence of operations is a measurement of the ancilla qubit (measure-Z or measure-X) in the center of the plaquette. The measurement of this ancilla qubit returns a syndrome bit corresponding to the parity of the number of errors on the qubits of the plaquette. For example, a 0-value bit indicates a trivial syndrome (implying either an absence of fault or an even number of faults that cancel out) while a 1-value bit indicates a non-trivial syndrome (either a single fault or an odd number of faults).

Figure 2B:
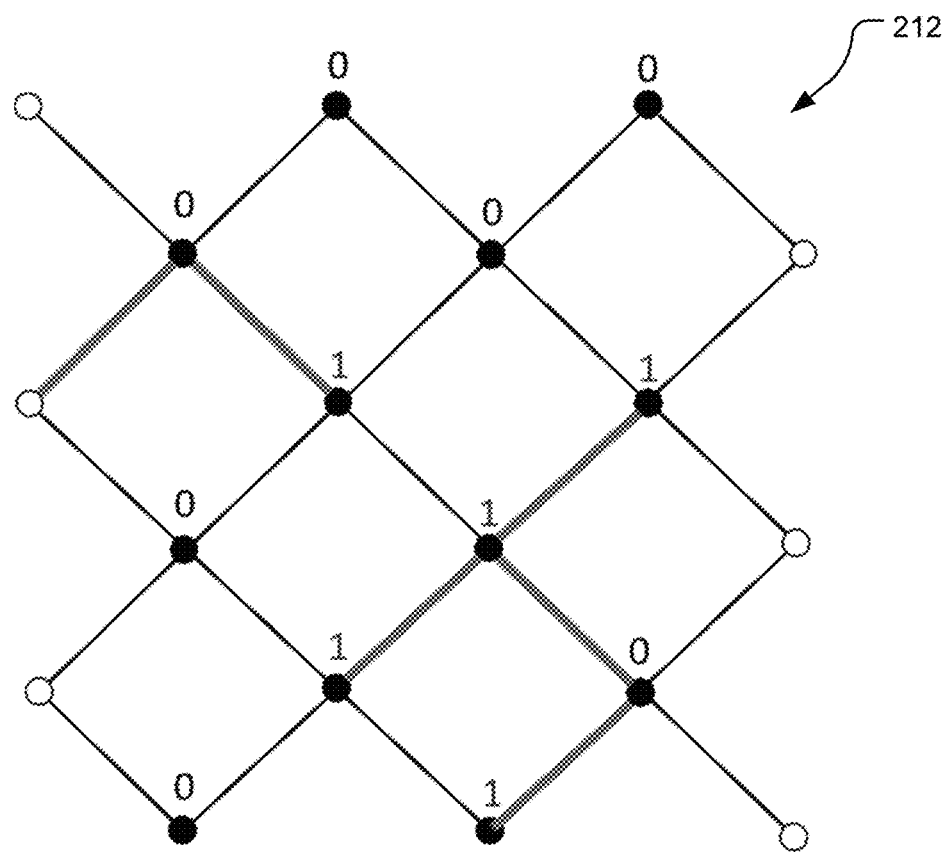
FIG. 2B illustrates a graph structure that is representative of a measured syndrome using the syndrome measurement circuit of FIG. 2A.

FIG. 2B illustrates a graph structure 212 that is representative of a measured syndrome using the syndrome measurement circuit of FIG. 2A. This type of structure is referred to herein as a "decoding graph." The graph structure 200 represents a 2D decoding graph of the form graph G=(V, E) for the correction of X-type errors is a graph with vertex set $V=V_{\circ} \cup V_{\bullet}$, such that each edge of G corresponds to a qubit of the surface code and each node of $V_*$ corresponds to a Z measurement. The nodes of $V_*$ are referred to herein as the measurement nodes, while the nodes of $V_\bullet$ are herein referred to as boundary nodes. In FIG. 2B, measurement nodes are black and boundary nodes are white.

The 2d decoding graph of FIG. 2B provides a convenient representation of errors and syndromes. A X error pattern is represented by a binary error vector $x \in \mathbb{Z}_2^E$ such that $x(e)=1$ if and only if the edge e suffers form a X error. Given an error, if it is assumed that the measurement circuitry is ideal, a round of measurement returns the outcome vector $\overline{m} \in \mathbb{Z}_2^{V_*}$ such that the measurement outcome in node v is $$\overline{m}(v, x) = \left(\sum_{\substack{e \in E \\ v \in e}} x(e)\right) \bmod 2 \quad (1)$$

measuring the parity of the number of errors incident to v.

Quantum decoders typically extend the above model to account for qubit errors introduced during measurement. This is done by performing error correction based on multiple consecutive rounds of measurement data (e.g., as shown in FIG. 1 with respect to the syndrome re-measured at t=0, t=1, t=2, etc.). One common model accounting for errors introduced during measurement is the phenomenological noise model, which describes consecutive rounds of syndrome extraction as a sequence $N_1$, $M_1$, $N_2$, $M_2$, . . . alternating noise cycles $N_t$ and noisy measurement rounds $M_t$. A noise configuration for T rounds of syndrome extraction with phenomenological noise is a sequence $x_1$, $f_1$, . . . , $x_T$, $f_T$ where $x_t \in \mathbb{Z}_2^E$ is the error occurring during the noise cycle $N_t$ and $f_t \in \mathbb{Z}_2^V$ represents outcome flips during the t th measurement round. More precisely, $x_t(e)=1$ if an error occurs on qubit e during $N_t$ and $f_t(v)=1$ if and only if the outcome of the measurement of v during $M_t$ is flipped. Based on Eq.(1), the syndrome extraction round $M_t$ returns the outcome vector $\overline{m}_t \in \mathbb{Z}_2^{V_*}$ such that the outcome in node v is $$\overline{m}_t(v)=(m(v, x)+f_t(v)) \bmod 2 \quad (2)$$

where $x=(x_1+ \ldots +x_t) \bmod 2$. The outcome vector $\overline{m}_t$ depends on x which is the accumulation of all errors occurring before this measurement. Existing decoders generally approximate this outcome by mapping soft outcomes to hard outcomes. Exemplary hard outcome syndrome bit values (1s and 0s) are shown at the measurement nodes in FIG. 2B. As is discussed further below, the herein disclosed techniques provide for utilizing the soft outcome data, at least in part, to calculate parameters used by a decoding unit.

Figure 3:
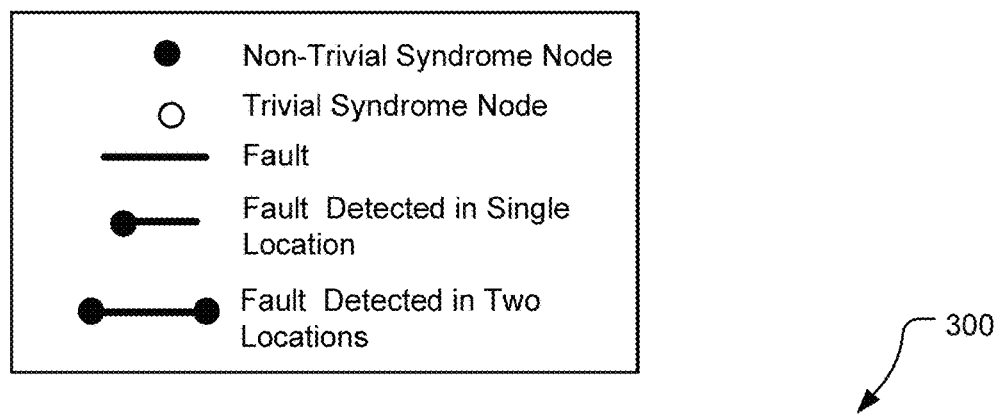
FIG. 3 illustrates an example of decoding logic implemented by a decoding unit.
Figure 3:
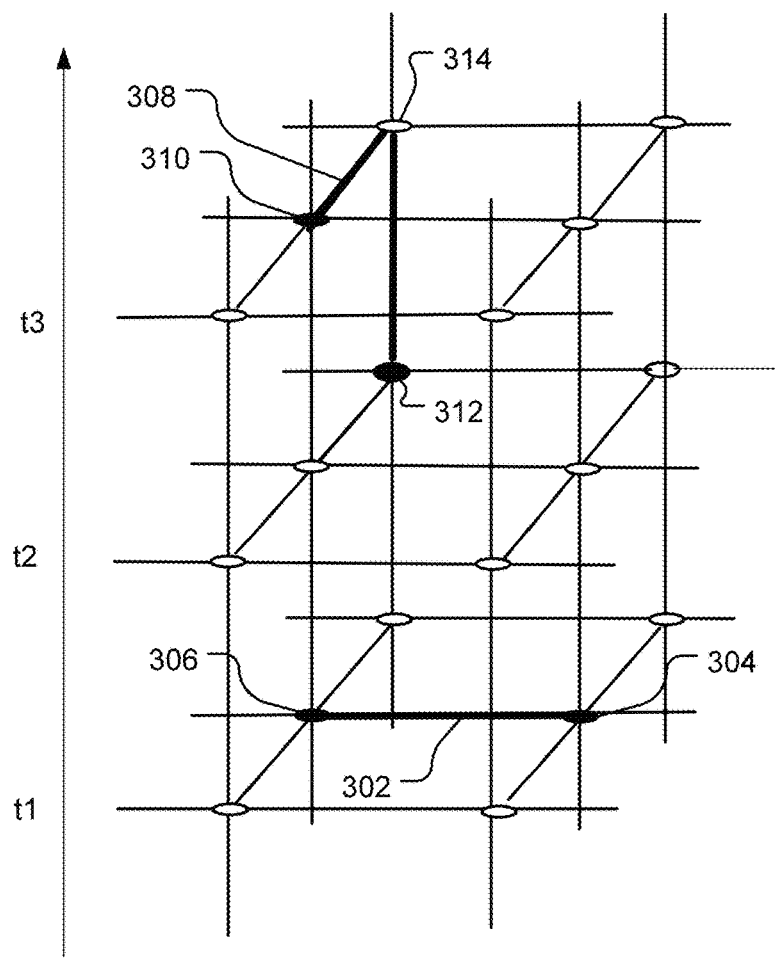

FIG. 3 illustrates an example of decoding graph 300 constructed by a decoding unit employing logic to identify fault locations affecting a syndrome measurement. For simplicity, the following discussion is generalized to logic that may be implemented by a variety of different types of decoding units. As explained with respect to FIG. 1, the decoding unit receives multiple rounds t of a syndrome, where each round of the syndrome includes an array of values.

In general, the objective of the decoding logic illustrated by the decoding graph 300 is to identify a set of fault paths that explain the received syndrome S for X-type or Z-type measurements received from the syndrome measurement circuit. It has been mathematically proven that the most likely fault configuration is given by what is referred to herein as "the minimum weight solution." Thus, the decoding unit employs logic to derive or estimate a minimum weight solution for a predefined number of syndrome measurement rounds.

As used herein, the term "minimum weight solution" refers to a set of paths formed along edges of the decoding graph that (1) collectively explain the observed non-trivial syndrome bits for a predefined number of measurement rounds where (2) the total summed weights of the individual paths in the set is a minimum among the set of paths satisfying (1). The "weight" or "distance" of a path is closely related to (and sometimes equated with) the number of edges in a path or solution set. For example, some decoders may employ logic providing that a solution consisting of one single edge has a weight of 1, while other decoders employ slightly different definitions. Exemplary definitions for edge weight are set forth herein with respect to FIG. 4.

The term "minimum weight path" is herein defined as a singular path formed by contiguous edges in the decoding graph, where the combined weight of all edges within the path is of a minimum total weight of any valid path that exists to explain non-trivial bit values corresponding to endpoints of the path. It is known that, statistically, a minimum weight path is very close to being the most likely fault path between two non-trivial syndrome bits.

In the illustrated example, the decoding graph 300 includes four non-trivial nodes (filled circles) that are observed over three measurement rounds. A first path 302 of length 1 (one edge) is shown between non-trivial syndrome nodes 304, 306. A fault that occurs along the path 302 fully explains the non-trivial syndrome nodes 304, 306. Thus, the first path 302 is a minimum weight path that is one of multiple paths in the illustrated minimum weight solution. A second path 308 extends between non-trivial nodes 310, 312. This path has a length of 2-edges, where a fault on each of the two edges would explain the non-trivial nodes 310, 312 (e.g., the even-number of faults affecting trivial node 314 causes this node to be trivial rather than non-trivial). This is also a minimum weight fault path. Collectively, the paths 302 and 308 represent the minimum weight solution to the decoding graph 300.

According to one implementation, the decoding unit computes the minimum weight solution for the decoding graph 300 by computing all possible paths that collectively explain the faults, computing the total "weight" of each path (net sum of edge weights), and then selecting the solution set that is of minimum total weight. Per the novel disclosed methodology (discussed further below), the weight of each of the edges in the decoding graph is computed based on soft outcome data. This improves accuracy of the decoding algorithm as compared to when the decoding methodology calculates edge weights based exclusively on hard outcome data.

Figure 4:
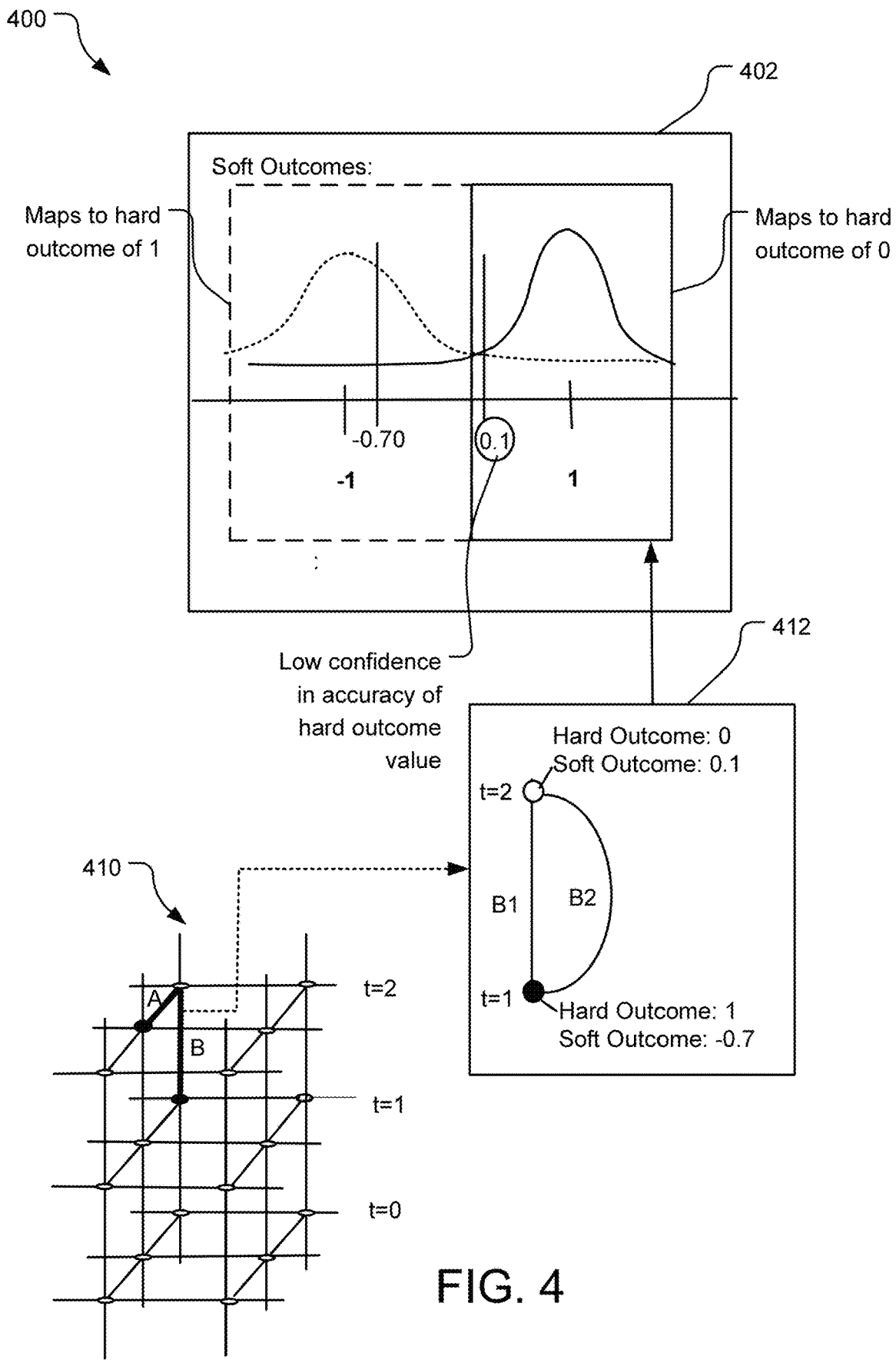
FIG. 4 illustrates an exemplary decoding logic that utilizes soft outcome data to compute soft vertical edge weights for a decoding graph.

FIG. 4 illustrates an exemplary decoding logic 400 that utilizes soft outcome data to compute soft vertical edge weights for a soft decoding graph 410. Here, soft edge weights are derived using a soft noise model, discussed below. Existing noise models such as the phenomenological noise model do not provide any mechanism or metric to account for the soft noise that arises due to imperfections in the quantum readout device and/or time constraints imposed on measurement rounds of the quantum readout device. Due to this soft noise, the data extracted from a syndrome measurement circuit is not a binary value but instead a real number.

In practice, the value $\overline{m}_t(v)$ (in Eqn. (2) above) cannot be measured. However, a naive estimation of this value can be attained by mapping each soft outcome value to a hard outcome value, $\hat{m} \in \mathbb{Z}_2^{V_*}$ defined by:

$$\hat{m}_t(v) = \begin{cases} 0 & \text{if } m_t(v) \geq 0, \\ 1 & \text{if } m_t(v) < 0 \end{cases} \quad (3)$$

An exemplary plot 402 in FIG. 1 illustrates this concept. In the plot 402, curves 404, 406 are assumed to have equivalent integral values. The curves may be gaussian or non-gaussian, as given by any probability distribution. Here, soft outcomes greater than 0 are mapped to a hard outcome of zero while soft outcomes less than 0 are mapped to a hard outcome of 1. Using the above relationship in Eqn. (3) to map soft outcome data to hard outcome data reduces performance of the detector because information is inevitably lost, at times, when the soft outcome is mapped to the wrong hard outcome value.

Rather than use the naive approximation of Eqn. (3) to map soft outcome data to hard outcome values and thereby discard the soft outcome values, the below-proposed soft noise model may provide a methodology for utilizing measured soft syndrome values in a way that more accurately accounts for the soft noise arising from within the measurement apparatus.

Soft noise model

Consider a sequence of T rounds of measurement for a surface code with qubit noise, $x_1, \ldots, x_T$ and outcome flips $f_1, \ldots, f_T$. The t-th round of measurement returns a soft outcome vector $m_t \in \mathbb{R}^{V_*}$ defined by $$m_t(v) = (-1)^{\overline{m}_t(v)} + A_{t,v} \quad (4)$$

where $\overline{m}_t(v)$ is defined in Eq. (2) and $A_{t,v}$ is the "soft noise" that can be any family of distribution that contains one distribution $A_{t,v}$ for each ancilla qubit and for each time step t. As an exxample, we can consider the normal distribution $A_{t,v} \sim N(0, \sigma)$ with variance $\sigma \in \mathbb{R}$ Graphical Model For Soft Noise Distribution In this section we provide a graphical representation of the errors distribution. It is an extension of the standard decoding graph (e.g., as shown in FIG. 3), that is based on a consideration of soft measurement data. An example soft decoding graph 410 is shown in FIG. 4 as corresponding to T=3 rounds of measurements for the surface code. There is a copy of the 2d decoding graph for each time step and an additional copy supporting no measurement is added for a proper termination.

Each measurement node $v_t$ (hollow and filled circles) at time t is connected to its counterpart $v_{t+1}$ at the next time step. For simplicity, the soft decoding graph 410 represents a single vertical edge connecting $v_t$ and $v_{t+1}$ but this graph is better understood as including a double edge between each vertical pair of nodes-a hard edge and a soft edge. To better illustrate this concept, an edge (B) from the decoding graph 410 is shown in expanded view 412 as including two counterparts—edges B1 and B2, wherein B1 is a hard edge (straight) and B2 is a soft edge (curved) extending in the time dimension between two measurements of a same node. In the soft decoding graph 410, horizontal edges correspond to qubit errors and vertical edges representing the time dimension (e.g., hard edge B1 and soft edge B2) encode hard and soft outcome flips, respectively.

We say that a hard flip occurs in node u if the hard outcome switches value between two consecutive time steps (e.g.,. $v_t$ and $v_{t+1}$).

We say that a soft flip occurs in node v between steps t and t+1 if the hard outcome (defined via equation (3)) does not equal the outcome vector (defined by equation (2) (e.g., $\hat{m}_t(v) \neq \overline{m}_t(v)$).

Consider an error configuration for T rounds of measurement with qubit errors $x_1, \ldots, x_T$ with hard flips $f_1, \ldots, f_T$ and soft flips, $\tilde{f}_1, \ldots, \tilde{f}_T$. The soft decoding graph is built in such a way that each edge corresponds to a possible fault in our noise model. An horizontal edge of the t th layer of G corresponds to a qubit error during $N_t$. A hard (respectively soft) vertical edge between $v_t$ and $v_{t+1}$ corresponds to a hard flip $f_t(v)$ (respectively soft flip $\tilde{f}_t(v)$). As a result, we can consider such an error configuration as an error vector $\varepsilon \in \mathbb{Z}_2^{E_T}$.

Edges of the horizontal edges (corresponding to qubit errors) depend on the qubit noise rate $p_q$ and the measurement outcome flip rate $p_f$. During a noise cycle $N_t$, each qubit is affected by an error with probability p and errors are independent. During a measurement round $M_t$, the outcome of the measurement of node v is flipped independently with probability $p_f$. Given the noise parameters $p_q$ and $p_f$ and the sequence of soft outcomes $m_1, \ldots, m_T$, we define edge weights for the soft decoding graph 410.

In view of the foregoing, the weight of horizontal edges is, in one implementation, set to:

$$w_q = -\log(p_q/(1-p_q)) \quad (5)$$

while the weight of hard vertical edges (e.g.,. weight of B1) is:

$$w_f = -\log(p_f/(1-p_f)) \quad (6)$$

and the weight of the soft vertical edges $\{v_t, v_{t+1}\}$, also referred to herein as a the "soft edge weight," (e.g., weight of B2) is defined to be:

$$w_{soft}(\{v_t, v_{t+1}\}) = -\log\frac{G(o', \sigma, m_t(v))}{G(o, \sigma, m_t(v))} \quad (7)$$

where o is the hard outcome $o=(-1)^{\hat{m}_t(v)}$ in node v at round t and o'=-o is the flipped hard outcome. Note that by definition of the hard outcome $\hat{m}_t(v)$, this edge weight is non-negative. The soft edge weight given by Eqn. (7) represents a likelihood-ratio test (ratio of probability), and more specifically, a ratio between the probability that the observed soft outcome value comes from either a -1 or a 1, as generally shown with respect to the plot 402. Here, the numerator on the right-hand side of Eqn. (7) represents the -log of a probability density function of the soft outcome centered on the opposite of the hard outcome while the denominator on the right-hand side represents the -log of a probability density function of the soft outcome centered on the hard outcome.

In general, the ratio expressed by Eqn. (7) above gets smaller as the soft outcome for a particular bit approaches the hard outcome value for the bit. This ratio gets larger as the soft outcome approaches 0 (e.g., approaches the furthest point possible from the hard outcome value that still shares the sign (+/-) of the hard outcome value). What this means is that when the soft outcome value is near zero, there exists a low confidence in the accuracy of the hard outcome value at the given timestep. In this case, the soft edge weight of the corresponding vertical edge (e.g., B2) approaches 0 (e.g., $-\log(\sim 1/1)=0$). At the same time, when the soft outcome value is closer to the hard outcome, there exists a higher confidence in the accuracy of the hard outcome value. In this case, the soft weight of the corresponding vertical edge becomes very large (e.g., -log(value close to 0)=large value).

In effect, the soft edge weight expression given above in Eqn. (7) relies on soft values to adjust the vertical edge weight to be greater than 1 when there is a high confidence in the hard outcome and to adjust the vertical edge weight to trend toward 0 as the confidence in the hard outcome decreases. When Eqn. (7) is used to calculate vertical edge weights that are used by a decoder (e.g., the edge weights used by a decoding unit such as the MWPM decoder or the UF decoder), the soft edge weights bias the decoder toward selecting solution sets including edges that represent low-confidence hard flips as prospective fault locations.

For instance, FIG. 4 illustrates an example whereby edge 'B' of the decoding graph represents a low-confidence hard flip. This is because the soft outcome value (e.g., 0.1) of the upper node is very close to 0, which is the midpoint between the two distributions. Via the naive mapping provided by Eqn. (3) (soft outcome to hard outcome), this node experiences a hard flip between t=1 and t=2; however, the confidence in this flip is very low due to the actual soft outcome value at t=2. This low confidence makes it more likely that the upper node (at t=2) on edge B is actually non-trivial (detecting a nearby fault), meaning that it is appropriate and desirable to include edge B in a minimum weight solution that is output by the decoding unit.

By modifying the decoding unit to utilize soft edge weight values for the vertical edges of the decoding graph 410, the decoder is more likely to select a more accurate minimum weight solution. For example, at each syndrome round (t=0, t=1, t=2, etc.) the soft edge weights are computed for the round using Eqn. (7) (e.g., by the soft information computation engine of FIG. 122) and these weights are provided to the decoding unit for the vertical in place of traditionally-computed vertical edge weights.

Figure 5:
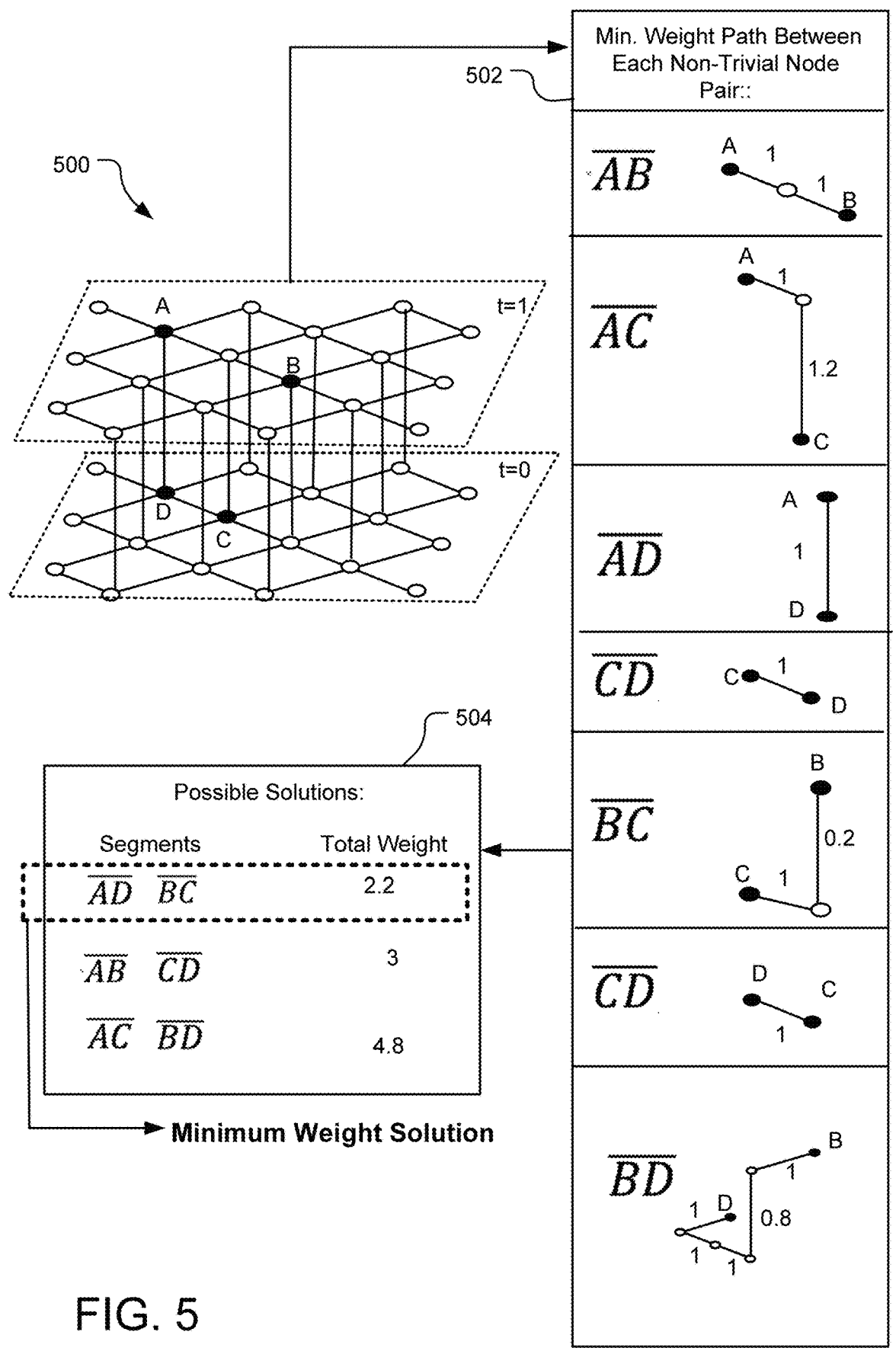
FIG. 5 illustrates example decoding logic that relies on edge weights computed based on soft information.

FIG. 5 illustrates exemplary decoding logic that uses soft information to compute edge weights for a single measurement round of a decoding graph 500.

The decoding graph 500 is shown to include two rounds of measurement (t=0 and t=1). The decoding graph 500 may be understood as including nodes corresponding to hard outcome values. Specifically, open (white) nodes correspond to trivial hard syndrome values and filled (black) nodes correspond to non-trivial hard syndrome values. Although not shown, it is assumed that all horizontal edges have weights computed based on hard outcome values (e.g., as shown by Eqn. (5) above). Vertical edges, in contrast, have weights computed based on soft outcome values (e.g., the real number values actually returned from the syndrome measurement circuit). For simplicity, the four non-trivial nodes in the decoding graph 500 are labeled as A, B, C, and D.

To identify fault locations, a decoder seeks to identify a minimum weight solution that would explain non-trivial syndromes observed during the previous round of measurement. Although different algorithms may employ different logic, one popular approach is to try to identify a path extending between each pair of non-trivial nodes within the path. Each such path is referred to herein as a valid candidate path. For example, the non-trivial nodes A and D can be explained by 1-edge segment representing a single fault location. This is therefore a valid candidate path that the decoding unit may consider for inclusion in a minimum weight solution. In contrast, a path extending from A to D to C can be formed with two edges; however, this path is not a valid candidate path because the existence of a fault along each of the two edges would not fully explain all non-trivial node values along the path (e.g., the two non-trivial edges amount to an even number that should cancel out and cause node D to be trivial rather than non-trivial).

Visually, the identification of valid candidate paths in the decoding graph 500 can be illustrated by drawing one or more paths between each pair of non-trivial nodes, where each path intersects, at most, 2 non-trivial nodes (e.g., the endpoints). An exemplary non-inclusive set of valid candidate paths is shown in view 502. Notably, it may be possible to compute multiple valid candidate paths for some pairs of non-trivial nodes. This extension is excluded from FIG. 5 for simplicity of illustration.

During the fault identification process for each round of syndrome measurement, a decoder determines (e.g., computes or receives) edge weights for each candidate path that is identified as explained above. In one implementation, horizontal edge weights are determined differently than vertical edge weights. For example, horizontal edge weights may be computed utilizing Eqn. (5) above (based on hard outcome values) while vertical edge weights are based, at least in part, on soft outcome values. In one implementation, vertical edge weights are "soft" edge weights computed via Eqn. (7) above. In general, when Eqn. (5) is used to compute the horizontal edge weights ($w_q = -\log(p_q/(1-p_q))$), horizontal edge weights do not vary much with varying values of p. Typical values of p may, for example, range from .00001 to .001, leading to weights between 6.9 and 11.5. For simplicity and ease of concept, all horizontal edge weights are shown to be "1" in FIG. 5. In contrast to horizontal weights, soft vertical edge weights computed via Eqn. (7) may exhibit values spanning a larger range of values.

After determining edge weights for each of the identified minimum-fault paths existing within the decoding graph 500, the decoding unit seeks to identify a minimum weight solution. This solution consists of a discrete subset of the identified paths in which the non-trivial endpoints A, B, C, and D each appear exactly once, where the solution represents the minimum total edge weight of all valid solutions.

In the example of FIG. 5, the identified valid candidate paths provide three possible solution sets that each consist of two discrete paths. These solutions are shown in view 504. A first of these solutions includes the paths $\overline{AD}$ and $\overline{BC}$, and has a total weight of 2.2 (e.g., 1+1.2). A second of these solutions includes the paths $\overline{AB}$ and $\overline{CD}$, and has a total weight of 3 (e.g., 2+1). A third of these solutions includes the paths $\overline{AC}$ and $\overline{BD}$, and has a total weight of 4.8 (e.g., 1+1+1+0.8), Here, the minimum weight solution is given by the first solution—paths $\overline{AD}$ and $\overline{BC}$. This solution may, in turn, be output by the decoding unit and provided to an error correction code to classically correct stored values corresponding to the qubits affected by the faults identified.

Table 1 (below) provides a mathematical proof demonstrating that one can find the most likely error configuration in a decoding graph by finding a subset of edges of minimum weight that explain the syndrome (e.g., the minimum weight solution) with vertical edge weights derived using Eqn. (7) above.

TABLE 1

Proposition 1: Any error configuration $x = (x_1, \ldots, x_T)$ for T rounds of measurements with hardflips $f = (f_1, \ldots, f_T)$ and soft flips $f = (f_1, \ldots, f_T)$ corresponds to a vector $\varepsilon \in \mathbb{Z}_2^{E_T}$. Moreover, given the soft measurements outcomes $m = (m_1, \ldots, m_T)$, we have
$$-\log \mathbb{P}(\varepsilon|m) = C + \Sigma_{e \in E_T} w(e)\varepsilon(e) \quad (8)$$
for some constant C that depends only on $p_q$, $p_f$ and m.
We illustrate our result with classical Gaussian noise for simplicity but Proposition 1 holds for any classical noise distribution. We only require the random variables $A_{v,t}$ to be independent. For a general family of random variables $A_{v,t}$, the edge weight defined in Eq. (7) must be replaced by $$w_{soft}(\{v_t, v_{t+1}\}) = -\log \frac{\phi_{v,t}(m_t(v) \mid (\hat{m}_t(v) + 1) \bmod 2)}{\phi_{v,t}(m_t(v) \mid \hat{m}_t(v))} \quad (9)$$

where $\phi_{v,t}$ is probability density function for the conditional distribution of the soft outcome given the hard outcome in node v at step t. In the discrete case, we replace the probability density function by the probability distribution. The proof of Proposition 1 (below) is unchanged.

Proof. The first part of this proposition was justified after the definition of the soft decoding graph. Let us prove that Eq. (7) holds.
To compute $\mathbb{P}(\varepsilon|m)$, we apply Bayes theorem to obtain
$$\mathbb{P}(\varepsilon|m) = \mathbb{P}(x, f|m) \propto \mathbb{P}(m|x, f)\mathbb{P}(x)\mathbb{P}(f) \quad (10)$$
The first equality holds because f is fully determined by x, f and m. Then, we used the independence of x and f to write $\mathbb{P}(x, f) = \mathbb{P}(x)\mathbb{P}(f)$. Therein, we use the abusive notation $\mathbb{P}(m|x, f)$ to represent the probability density function of the continuous random variable m conditioned on x and f.
We will consider the three terms of the right hand side of (9) separately. First, we will prove that
$$-\log \mathbb{P}(x) = C_1 + \Sigma_{e \in E_T^h} w(e)\varepsilon(e), \quad (11)$$
for some constant $C_1$, where $E_T^h$ denotes the set of horizontal edges of $G_T$. Given that x is supported on horizontal edges of $G_T$, using the independence of qubit noise we can write $$\mathbb{P}(x) = \prod_{\substack{e \in E_T^h \\ x(e)=1}} p_q \prod_{\substack{e \in E_T^h \\ x(e)=0}} (1 - p_q) = (1 - p_q)^{|E_T^h|} \prod_{\substack{e \in E_T^h \\ x(e)=1}} \left(\frac{p_q}{1 - p_q}\right).$$

By definition of the horizontal edge weight, Eq. (10) follows by taking the log. Using a similar argumentation for the hard flip, we obtain
$$-\log \mathbb{P}(f) = C_2 + \Sigma_{e \in E_T^{v,hard}} w(e)\varepsilon(e), \quad (12)$$
for some constant $C_2$, where $E_T^{v,hard}$ denotes the set of hard vertical edges of $G_T$.
Finally, we will show that
$$-\log \mathbb{P}(m|x,f) = C_3 + \Sigma_{e \in E_T^{v,soft}} w(e)\varepsilon(e), \quad (13)$$
for some constant $C_3$, where $E_T^{v,hard}$ denotes the set of soft vertical edges of $G_T$.
By definition of m, we have $\mathbb{P}(m|x, f) = \mathbb{P}(m|\bar{m})$. Thanks the independence of the soft noise, we can use Eq. (4) which yields $$\mathbb{P}(m \mid \bar{m}) = \prod_{v_t \in V_T} G\big((-1)^{\bar{m}_t(v)}, \sigma, m_t(v)\big)$$

$$= \prod_{\substack{v_t \in V_T \\ \bar{m}_t(v) = \hat{m}_t(v)}} G\big((-1)^{\hat{m}_t(v)}, \sigma, m_t(v)\big) \prod_{\substack{v_t \in V_T \\ \bar{m}_t(v) \neq \hat{m}_t(v)}} G\big((-1)^{\hat{m}_t(v)+1}, \sigma, m_t(v)\big)$$

$$= \prod_{v_t \in V_T} G\big((-1)^{\hat{m}_t(v)}, \sigma, m_t(v)\big) \prod_{\substack{v_t \in V_T \\ \bar{m}_t(v) \neq \hat{m}_t(v)}} \frac{G\big((-1)^{\hat{m}_t(v)+1}, \sigma, m_t(v)\big)}{G\big((-1)^{\hat{m}_t(v)}, \sigma, m_t(v)\big)}$$

The first product $C_{3'} = \Pi_{v_t \in V_T} G((-1)^{\hat{m}_t(v)}, \sigma, m_t(v))$ depends only on the soft outcome $\hat{m}$ since m is fully determined by m. The condition $\bar{m}_t(v) \neq \hat{m}_t(v)$ in the second product is equivalent to the presence of a soft flip in the measurement of v at step t, which corresponds to $\varepsilon(e) = 1$ for the soft edge $e = \{v_t, v_{t+1}\}$. Moreover, the fraction $\dfrac{G\big((-1)^{\hat{m}_t(v)+1}, \sigma, m_t(v)\big)}{G\big((-1)^{\hat{m}_t(v)}, \sigma, m_t(v)\big)}$ coincides with the fraction defining the edge weight of this soft edge e in Eq. (7). This shows Eq. (13) after taking the log. The proposition follows by taking the log of Eq. (10) and applying Eq. (11), (12), and (13).

---

While FIG. 4 (above) sets forth general logic that may be employed by a decoding unit to compute a minimum weight solution based on soft information, the following text sets forth a specific design a soft Minimum Weight Perfect Matching decoder along with a proof (Table 2) that this decoder design returns a most likely error configuration.

Soft Decoding of Surface Codes using a Minimum Weight Perfect Matching Decoder Given a hard outcome $\hat{m}$ for T rounds of measurements, we compute the syndrome $\hat{s}=(\hat{s}_1, \ldots, \hat{s}_T) \in \mathbb{Z}_2^{V_T}$ defined by $\hat{s}_1(v) = \hat{m}_1(v)$ and $$\hat{s}_t(v) = (\hat{m}_t(t) + \hat{m}_{t-1}(v)) \bmod 2 \tag{14}$$

for all $t=2, \ldots, T$ and for all $v \in V$. The syndrome $\hat{s}$ is a binary vector that encodes the exact same data as the hard outcome $\hat{m}$. What makes the syndrome more convenient is its graphical meaning. Consider a subset of edges of $G_T$ represented by a vector $\varepsilon \in \mathbb{Z}_2^{E_T}$. Recall that the $\mathbb{Z}_2$—boundary of $\varepsilon$ is defined to be set of vertices $\partial \varepsilon \subseteq V_T$, incident to an odd number of edges of $\varepsilon$.

TABLE 2

Lemma 2.1 Given an error $\varepsilon \in \mathbb{Z}_2^{E_T}$ for T rounds of measurement (including soft flip), the set of nodes of $G_T$ supporting non-trivial syndrome bits is the boundary $\partial \varepsilon$ of the error.

Proof. By linearity, it suffices to check this for a single fault. A single flip (hard or soft) on the vertical edge $\{v_t, v_{t+1}\}$ leads to a non-trivial syndrome in $\hat{s}_t(v)$ and $\hat{s}_{t+1}(v)$, that is on the two endpoints of this vertical edge. Similarly, a qubit error on the horizontal edge $\{u_t, v_t\}$ results in a non-trivial syndrome bits $\hat{s}_t(u)$ and $\hat{s}_t(v)$ corresponding to the nodes $u_t$ and $v_t$.

Given the outcome m observed, we compute the syndrome $\hat{s}$. Based on Lemma 4.1, the goal of the decoder is to identify a set of edges $\varepsilon \in \mathbb{Z}_2^{E_T}$ whose boundary is given by the non-trivial syndrome nodes.

We consider the distance in the graph $G_T$ induced by the edge weights w(e). The length of a path in G is defined to be the sum of the weights of its edges. The distance $d_{G_T}(u, v)$ between two vertices u and v, is defined to be the minimum length of a path connecting u and v. A minimum length path joining u and v is called a geodesic. Given $u, v \in V_T$, let geo(u, v) $\subseteq E_T$ be the set of edges supporting a geodesic connecting u and v.

Given the soft decoding graph $G_T$ and a syndrome $\hat{s}$, the distance graph $K(\hat{s}) = (V_K, E_K)$ is defined to be the fully connected graph with vertex set $V_K = \{v_t \in V_T \mid \hat{s}_t(v) = 1\}$ and with edge weight $w(\{u, v\}) = d_{G_T}(u, v)$.

Proposition 2.2 Let m be a soft outcome for T rounds of measurement and let $\hat{s}$ be the corresponding syndrome. Consider the distance graph $K(\hat{s}) = (V_K, E_K)$ associated with $\hat{s}$. For any subset $M \subseteq E_K$, let $\varepsilon_M \in \mathbb{Z}_2^{E_T}$ be the error configuration with support $\bigcup_{\{u,v\} \in M} \text{geo}(u, v) \subset E_T$.

If M is a minimum weight perfect matching in $K(\hat{s})$, then the error configuration $\varepsilon_M$ is a most likely error configuration conditioned on the soft outcome m.

Just like Proposition 1, this result remains valid for general classical noise using the soft edge weights defined in Eq. (8). The proof is identical.

Proof. We will prove the proposition by contradiction. Assume that there exists an error $\varepsilon'$ such that $\mathbb{P}(\varepsilon'|m) > \mathbb{P}(\varepsilon_M|m)$.

By Lemma 4.1, the support of $\varepsilon'$ can be partitioned as a union of edge-disjoint paths connecting the nodes of the support of $\hat{s}$. Each path of this set corresponds to an edge in $K(\hat{s})$ and the complete set of paths forming $\varepsilon'$ induces a perfect matching M' in $K(\hat{s})$. Moreover, the weight of the matching M' is the sum of edge weights of $\varepsilon'$. Based on Proposition 1, this weight is equal to
$w(M') = \Sigma_{e \in E_T} w(e)\varepsilon'(e) = C - \log \mathbb{P}(\varepsilon'|m)$.
Using the assumption $\mathbb{P}(\varepsilon'|m) > \mathbb{P}(\varepsilon_M|m)$, this yields
$w(M') = C - \log \mathbb{P}(\varepsilon'|m) < C - \log \mathbb{P}(\varepsilon_M|m) = \Sigma_{e \in E_T} w(e)\varepsilon_M(e) = w(M)$
which contradicts the minimality of M.

A consequence of Proposition 2.2 is that one can efficiently compute a most likely error conditioned on a soft measurement outcome using a Minimum Weight Perfect Matching (MWPM) algorithm. Note that the edge weights in the distance graph are non-negative making the application of the MWPM algorithm straightforward. Algorithm 1 (below) describes the decoding strategy.

By example and without limitation, Table 3 below includes exemplary logic employed by a Soft MWPM decoder:

TABLE 3

Algorithm 1: Soft MWPM Decoder

Require: The soft decoding graph $G_T$ for T rounds of measurements, each round being represented by a soft outcome vector m.

Ensure: A most likely error configuration $\varepsilon \in \mathbb{Z}_2^{E_T}$ conditioned on the soft outcome m.

TABLE 3-continued

Algorithm 1: Soft MWPM Decoder

1. For each soft edge e, compute $w_{soft}(e)$ as a function of m using Eqn.(7).
2. Compute the syndrome $\hat{s}$ from m. Let $v_1, \ldots, v_k$ be the set of nodes of $G_T$ with non-trivial syndrome.
3. For i = 1, ..., k − 1 do:
   a. Run Dijkstra's algorithm to compute all the distances $d_{G_T}(v_i, v_j)$ with j > i.
   b. Construct the distance graph $K(\hat{s})$ with vertex set $V_K = \{v_1, \ldots, v_k\}$ and with edge weight $w(\{v_i, v_j\}) = d_{G_T}(v_i, v_j)$.
   c. Compute a minimum weight perfect matching M in $K(\hat{s})$ using Edmond's algorithm.
   d. For each edge $\{u, v\} \in M$, compute a geodesic geo(u, v) in the graph $G_T$.

TABLE 3-continued

Algorithm 1: Soft MWPM Decoder e. Return the error configuration $\varepsilon$ supported on the union of the geodesics geo(u, v) for $\{u, v\} \in M$.

The primary difference between the standard hard MWPM decoder and the Soft MWPM decoder proposed above in Table 3 is that, in the Soft MWPM decoder, the weights in the soft decoding graph depend on the input outcome m whereas they are fixed in the hard case. As a result, the distances between all pairs of nodes can be precomputed in the standard MWPM but not in the soft MWPM decoder. Similarly, one cannot precompute a geodesic for each pair of nodes in the soft decoding graph.

The Union-Find decoder, which achieves a good approximation of the MWPM decoder with complexity $O(d^3\alpha(d))$, can also be adapted to the correction of soft noise. The complexity of the soft Union-Find decoder depends on the precision required for the edge weights of the soft decoding graph.

Figure 6:
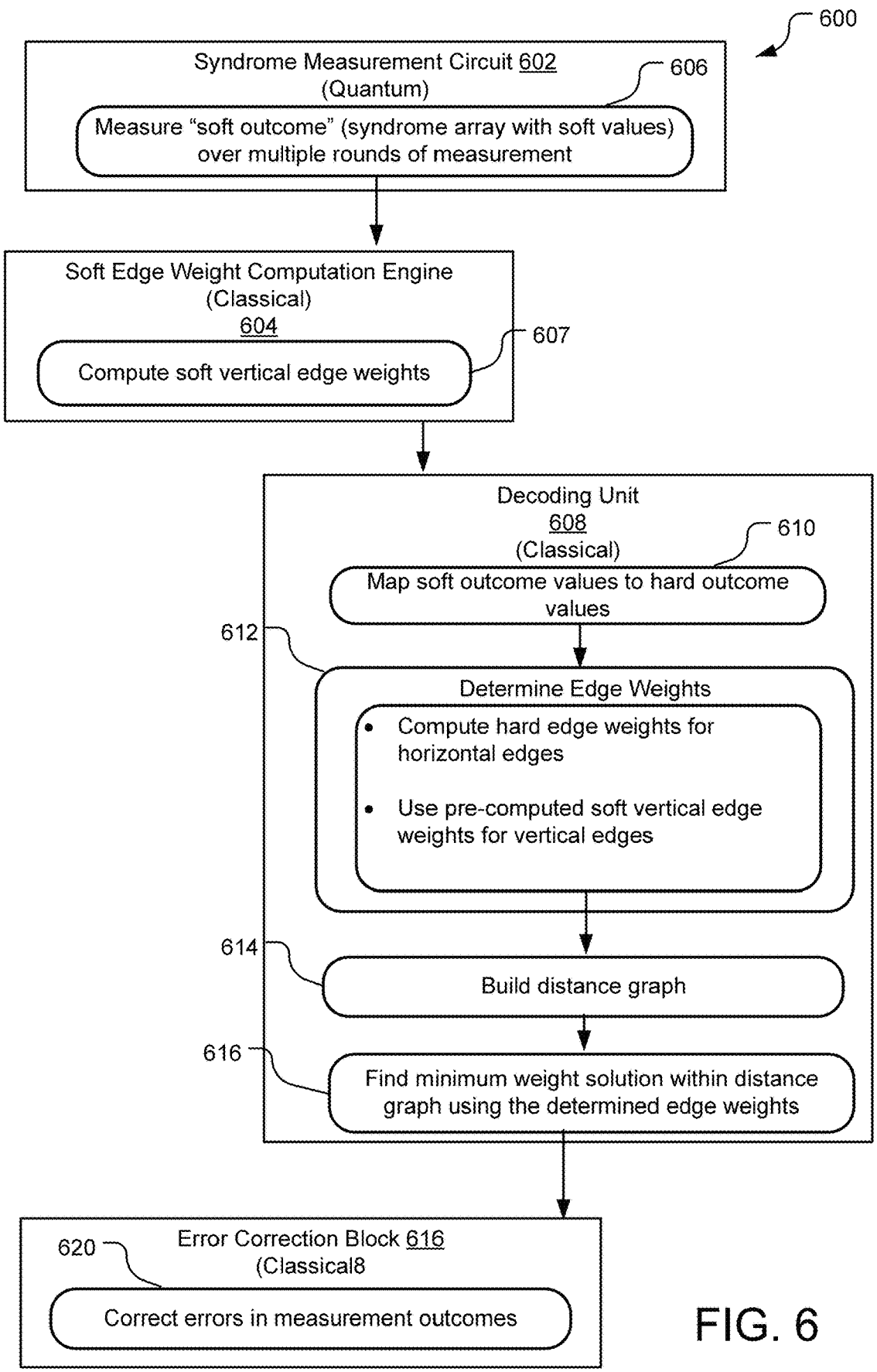
FIG. 6 illustrates example operations computed by different components of a exemplary quantum computing system that uses soft information to improve performance of a decoding unit.

FIG. 6 illustrates operations computed by different components of an exemplary quantum computing system 600 that uses soft information to improve performance of a decoding unit. The quantum computing system 600 includes a syndrome measurement circuit 602 comprising quantum hardware. The syndrome measurement circuit 602 performs multiple rounds of syndrome measurements 606 that each measure a soft outcome vector (e.g., a syndrome array consisting of soft values) consisting of an array of soft bit values. At each round of measurement, the syndrome measurement circuit 602 outputs the measured soft outcome vector to a soft edge weight computation engine 604. In one implementation, the soft edge weight computation engine 604 is implemented as software executable by a classical processor.

The soft edge weight computation engine 604 computes (at operation 607) soft vertical edge weights for each round of measurement. Soft vertical edge weights are to be understood as values corresponding to vertical edges on a decoding graph that corresponds to the physical layout of qubits of the syndrome measurement circuit 606. In one implementation, the soft vertical edge weights are computed using Eqn. (7) as provided herein (e.g., based exclusively on soft outcome data). In other implementation, the soft vertical edge weights are computed based on a mix of hard and soft outcome data for the given measurement round. Although the soft edge weight computation engine 604 is shown separate from the decoding unit 608, some implementations of the disclosed technology may incorporate some or all logic of the soft edge weight computation engine 604 within the decoding unit 608.

The decoding unit 608 performs a sequence of operations to identify fault locations in the decoding graph and—more generally, to identify the actual corresponding locations of faults within the syndrome measurement circuit 602. This logic is based, at least in part, on the soft vertical edge weights that are computed by the soft edge weight computation engine 604 following each round of syndrome measurement.

The decoding unit 608 may be any decoding unit that computes or approximates a minimum weight solution including without limitation, the Minimum Weight Perfect Matching (MWPM) decoder, the Union-Find (UF) decoder, or other machine learning decoders or tensor network decoders.

Following each round of measurement performed by the syndrome measurement circuit 602, the decoding unit 608 receives inputs including (1) the soft outcome data measured by the syndrome measurement circuit 602; and (2) the soft vertical edge weights (e.g., defined as described above with respect to FIG. 4) that are computed by the soft edge weight computation engine 604 based on the soft outcome data for the measurement round.

Specific operations of the decoding unit 608 may vary slightly in substance or in order based on the particular design of the decoding unit 608. In the illustrated example, the decoding unit 608 performs a mapping operation 610 in which the received soft outcome values are mapped to hard outcome values, such as given by the relationship set forth in Eqn. (3) above. Following this mapping of the soft outcome values to hard outcome values, the decoding unit 608 determines (at operation 612) edge weights of all edges of a decoding graph representing to the qubit configuration of the syndrome measurement circuit 602. Determining edge weights comprises operations including:

(1) computing or otherwise determining hard edge weights for horizontal edges (e.g., such as using Eqn. (5), above); and (2) using the received soft vertical edge weights as the vertical edge weight values. In another implementation, the decoding unit 608 determines vertical edge weights based on a combination of hard and soft vertical edge weights (e.g., computed via Eqn. (6) and (7) above, respectively).

Based on the edge weights determined by the operation 612, the decoding unit proceeds to build a distance graph at operation 614. In this step, the decoding unit 608 computes a distance (weight) between all possible pairs of non-trivial syndrome bits (e.g., in a manner the same or similar to that discussed with respect to FIG. 5).

At a solution selection operation 616, the decoding unit 608 uses the distance graph constructed at the operation 612 to identify a minimum weight solution. The minimum weight solution is provided to an error correction block 618 that performs operations (at 620) for correcting classically correcting errors that impacted measurement(s) performed by the syndrome measurement circuit 602.

Figure 7:
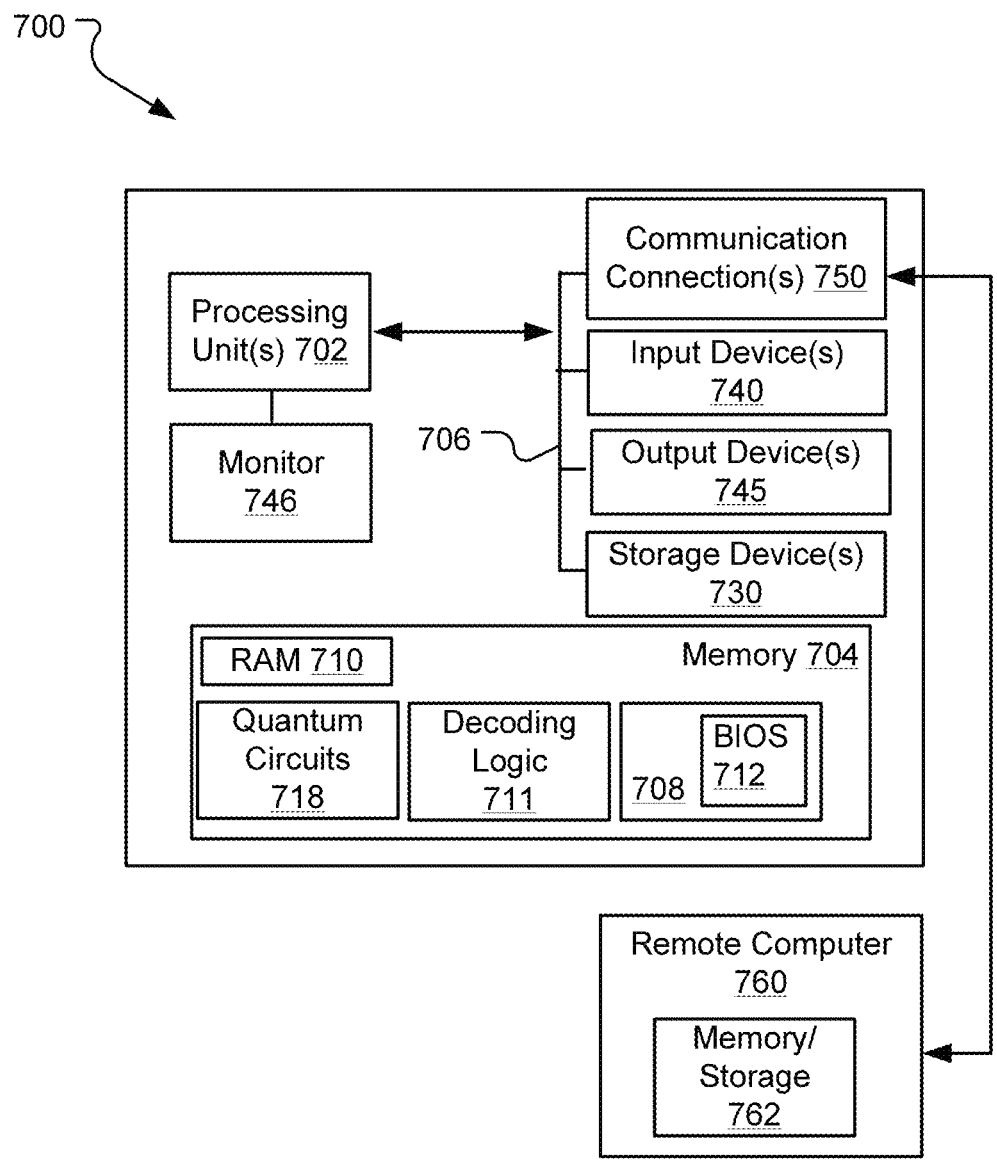
FIG. 7 illustrates exemplary computing environment suitable for implementing aspects of the disclosed technology.

FIG. 7 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. Typically, a classical computing environment is coupled to a quantum computing environment, but a quantum computing environment is not shown in FIG. 7.

With reference to FIG. 7, an exemplary system for implementing the disclosed technology includes a general purpose computing device in the form of an exemplary conventional PC 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 708 and random access memory (RAM) 710. A basic input/output system (BIOS) 712, containing the basic routines that help with the transfer of information between elements within the PC 700, is stored in ROM 708.

In on implementation, the system memory 704 stores decoding logic 711, such as QECCs and logic specifically implemented by various system decoders, such as the MWPM decoder or the UF decoder that may determine vertical edge weights of a decoding graph based on soft information, as described herein.

The exemplary PC 700 further includes one or more storage devices 1230 such as a hard disk drive for reading from and writing to a hard disk, a magnetic disk drive for reading from or writing to a removable magnetic disk, and an optical disk drive for reading from or writing to a removable optical disk (such as a CD-ROM or other optical media).-Such storage devices can be connected to the system bus 706 by a hard disk drive interface, a magnetic disk drive interface, and an optical drive interface, respectively. The drives and their associated computer readable media provide nonvolatile storage of computer-readable instructions, data structures, program modules, and other data for the PC 700. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1230 including an operating system, one or more application programs, other program modules, and program data. Decoding logic can be stored in the storage devices 730 as well as or in addition to the memory 704. A user may enter commands and information into the PC 700 through one or more input devices 740 such as a keyboard and a pointing device such as a mouse. Other input devices may include a digital camera, microphone, joystick, game pad, satellite dish, scanner, or the like. These and other input devices are often connected to the one or more processing units 702 through a serial port interface that is coupled to the system bus 706, but may be connected by other interfaces such as a parallel port, game port, or universal serial bus (USB). A monitor 746 or other type of display device is also connected to the system bus 706 via an interface, such as a video adapter. Other peripheral output devices 745, such as speakers and printers (not shown), may be included.

The PC 700 may operate in a networked environment using logical connections to one or more remote computers, such as a remote computer 760. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 has been illustrated in FIG. 7. The personal computer 700 and/or the remote computer 1260 can be connected to a logical a local area network (LAN) and a wide area network (WAN). Such networking environments are commonplace in offices, enterprise wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

A system disclosed herein includes a soft information computation engine and a decoding unit. The soft information computation engine computes soft information quantifying an effect of soft noise on multiple rounds of a syndrome measurement output by a quantum measurement circuit. In this context, "soft noise" refers to noise that introduces variability in repeated measurements of ancilla qubits due to at least one of imperfections in a readout device and limited measurement time for the repeated measurements. The decoding unit uses the computed soft information to identify fault locations that collectively explain the syndrome measurement output.

In another example system of any preceding system, the soft information computing engine is further configured to receive, from the quantum measurement circuit, multiple rounds of a soft outcome vector. The soft outcome vector contains real number values representing measurements of a plurality of syndrome bits, where each of the syndrome bits provides information about one or more errors affecting a quantum measurement. The soft information computing engine is further configured to generate a decoding graph defining nodes corresponding to the plurality of syndrome bits, where the nodes are connected to one another by horizontal edges and vertical edges. The soft information computing engine computes a set of soft edge weights, each of the soft edge weights corresponding to one of the vertical edges in the decoding graph and being based on real number measurement values of a syndrome bit corresponding to endpoints of the vertical edge.

In yet still another example system of any preceding system, the decoding unit is further configured to determine a minimum weight solution for the decoding graph based on the computed soft edge weights.

In still another example system of any preceding system, the soft noise is distinct from quantum noise arising from bit-flips in data qubits that are indirectly measured by the ancilla qubits.

In another example system of any preceding system, the decoding unit uses the soft edge weights as edge weights for vertical edges of the decoding graph.

In still another example system of any preceding system, the soft information computing engine computes the set of soft edge weights based on a real number measurement value of each of the syndrome bits and also based on a hard outcome value for each of the syndrome bits.

In yet still another example system of any preceding system, the decoding unit implements logic of at least one of a union find (UF) decoder and a minimum weight perfect matching (MWPM) decoder.

An example method disclosed herein provides for computing soft information that quantifies an effect of soft noise on multiple rounds of a syndrome measurement output by a quantum measurement circuit, where the soft noise introduces variability in repeated measurements of ancilla qubits due to at least one of limited measurement time and imperfections in a readout device. The soft noise is distinct from quantum noise that arises from bit-flips in data qubits that are indirectly measured by the ancilla qubits. The method further provides for identifying fault locations within the quantum measurement circuit based on the computed soft information where the identified fault locations collectively explain the syndrome measurement output.

In still another example method of any preceding method, computing the soft information further includes receiving, from the quantum measurement circuit, multiple rounds of a soft outcome vector that contains real number values representing measurements of a plurality of syndrome bits providing soft information errors affecting a quantum measurement. The method further provides for generating a decoding graph defining nodes corresponding to the plurality of syndrome bits, where the nodes are connected to one another by horizontal edges and vertical edges. Finally, the method further provides for computing a set of soft edge weights that each correspond to one of the vertical edges in the decoding graph and is based on real number measurement values of a syndrome bit corresponding to endpoints of the vertical edge.

In another example method of any preceding method, identifying fault locations further comprises determining a minimum weight solution for a decoding graph based on the computed soft information.

In still another example method of any preceding method, the decoding graph is a three-dimensional graph that includes multiple layers of a 2D grid having nodes that correspond to measurement locations of the syndrome bits within the measurement circuit. The multiple layers of the 2D grid are separated by vertical edges each representing a time step between repeated measurements of the nodes within the 2D grid.

In yet still another example method of any preceding method, determining the minimum weight solution further comprises using the computed set of soft edge weights as edge weights for corresponding vertical edges of the decoding graph.

In another example method of any preceding method, determining the minimum weight solution further comprises deriving edge weights for vertical edges of the decoding graph, each of the edge weights being based on a soft edge weight of the computed soft edge weights and a further based on a computed hard edge weight.

In still another example method of any preceding method, determining the minimum weight solution further comprises building a distance graph with at least one of a union find (UF) decoder and a minimum weight perfect matching (MWPM) decoder.

An example system disclosed herein includes a means for computing soft information that quantifies an effect of soft noise on multiple rounds of a syndrome measurement output by a quantum measurement circuit, where the soft noise introduces variability in repeated measurements of ancilla qubits due to at least one of limited measurement time and imperfections in a readout device. The soft noise is distinct from quantum noise that arises from bit-flips in data qubits that are indirectly measured by the ancilla qubits. The method further provides a means for identifying fault locations within the quantum measurement circuit based on the computed soft information where the identified fault locations collectively explain the syndrome measurement output.

An example computer-readable storage media disclosed herein encodes computer executable instructions for executing a computer process that provides for computing soft information quantifying an effect of soft noise on multiple rounds of a syndrome measurement output by a quantum measurement circuit. The soft noise includes noise that introduces variability in repeated measurements of ancilla qubits due to at least one of limited measurement time and imperfections in a readout device. The computer process further provides for identifying fault locations within the quantum measurement circuit based on the computed soft information, where the identified fault locations collectively explain the syndrome measurement output.

In another example computer process of any preceding computer process, the computer process further comprises receiving, from the quantum measurement circuit, multiple rounds of a soft outcome vector. The soft outcome vector contains real number values representing measurements of a plurality of syndrome bits providing soft information about errors affecting a quantum measurement. The computer process further provides for generating a decoding graph defining nodes corresponding to the plurality of syndrome bits, where the nodes are connected to one another by horizontal edges and vertical edges, and also for computing a set of soft edge weights, where each of the soft edge weights corresponds to one of the vertical edges in the decoding graph and is based on real number measurement values of a syndrome bit corresponding to endpoints of the vertical edge.

In another example computer process of any preceding computer process, identifying the fault locations further comprises determining a minimum weight solution for a decoding graph based on the computed soft information.

In another example computer process of any preceding computer process, determining the minimum weight solution further comprises: using the computed set of soft edge weights as edge weights for corresponding vertical edges of the decoding graph.

In yet still another example computer process of any preceding computer, process, determining the minimum weight solution further comprises deriving edge weights for vertical edges of the decoding graph, where each of the edge weights is based on a soft edge weight of the computed soft edge weights and further based on a computed hard edge weight computed.

In yet still another example computer process of any preceding computer process, the minimum weight solution further comprises: employing at least one of a union find (UF) decoder and a minimum weight perfect matching (MWPM) decoder to build a distance graph.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims. The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system comprising:
a soft information computation engine that:
receives multiple rounds of a syndrome measurement output by a quantum measurement circuit, the syndrome measurement including a soft value measured for each bit of a plurality of bits in a quantum circuit, the soft value measured for each of the bits being either of a first range corresponding to a hard outcome indicative of non-detection of a fault at a corresponding circuit location or of a second range corresponding to a hard outcome indicative of at least one fault detected at the corresponding circuit location;
computes soft information based on the soft values for each of the bits, the soft information indicating a confidence in the hard outcome associated with the bit and also quantifying an effect of soft noise on the multiple rounds of a syndrome measurement output by a quantum measurement circuit, the soft noise introducing variability in repeated measurements of ancilla qubits due to at least one of imperfections in a readout device and limited measurement time for the repeated measurements; and a decoding unit that uses the computed soft information to identify fault locations that collectively explain the syndrome measurement output, the soft information biasing the decoding unit toward selecting solution sets including fault locations that correspond to a subset of the bits characterized by low-confidence hard outcomes in the syndrome measurement.

2. The system of claim 1, wherein the soft information computing engine is further configured to:

receive, from the quantum measurement circuit, multiple rounds of a soft outcome vector, the soft outcome vector containing real number values representing measurements of a plurality of syndrome bits, each of the syndrome bits providing information about one or more errors affecting a quantum measurement;

generate a decoding graph defining nodes corresponding to the plurality of syndrome bits, the nodes being connected to one another by horizontal edges and vertical edges; and compute a set of soft edge weights, each of the soft edge weights corresponding to one of the vertical edges in the decoding graph and being based on a real number measurement value of a syndrome bit corresponding to endpoints of the vertical edge.

3. The system of claim 2, wherein the decoding unit is further configured to:

determine a minimum weight solution for the decoding graph based on the computed set of soft edge weights.

4. The system of claim 2, wherein the decoding unit uses the soft edge weights as edge weights for vertical edges of the decoding graph.

5. The system of claim 2, wherein the soft information computing engine computes the set of soft edge weights based on the real number measurement value of each of the syndrome bits and also based on a hard outcome value for each of the syndrome bits.

6. The system of claim 1, wherein the soft noise is distinct from quantum noise arising from bit-flips in data qubits that are indirectly measured by the ancilla qubits.

7. The system of claim 1, wherein the decoding unit implements logic of at least one of a union find (UF) decoder and a minimum weight perfect matching (MWPM) decoder.

8. A method comprising:

receiving multiple rounds of a syndrome measurement output by a quantum measurement circuit, the syndrome measurement including a soft value measured for each bit of a plurality of bits in a quantum circuit, the soft value measured for each of the bits being either of a first range corresponding to a hard outcome indicative of non-detection of a fault at a corresponding circuit location or of a second range corresponding to a hard outcome indicative of at least one fault detected at the corresponding circuit location;

computing soft information based on the soft values for each of the bits, the soft information indicating a confidence in the hard outcome associated with the bit and also quantifying an effect of soft noise on the multiple rounds of a syndrome measurement output by a quantum measurement circuit, the soft noise introducing variability in repeated measurements of ancilla qubits due to at least one of limited measurement time and imperfections in a readout device, the soft noise being distinct from quantum noise arising from bit-flips in data qubits that are indirectly measured by the ancilla qubits; and identifying fault locations within the quantum measurement circuit based on the computed soft information, the identified fault locations collectively explaining the syndrome measurement output, the soft information biasing a decoding unit toward selecting solution sets including fault locations that correspond to a subset of the bits characterized by low-confidence hard outcomes in the syndrome measurement.

9. The method of claim 8, wherein computing the soft information further comprises:

receiving, from the quantum measurement circuit, multiple rounds of a soft outcome vector, the soft outcome vector containing real number values representing measurements of a plurality of syndrome bits providing soft information errors affecting a quantum measurement;

generating a decoding graph defining nodes corresponding to the plurality of syndrome bits, the nodes being connected to one another by horizontal edges and vertical edges; and computing a set of soft edge weights, each of the soft edge weights corresponding to one of the vertical edges in the decoding graph and being based on real number measurement values of a syndrome bit corresponding to endpoints of the vertical edge.

10. The method of claim 8, wherein identifying fault locations further comprises:

determining a minimum weight solution for a decoding graph based on the computed soft information.

11. The method of claim 10, wherein the decoding graph is a three-dimensional graph that includes multiple layers of a 2D grid having nodes that correspond to measurement locations of the syndrome bits within the quantum measurement circuit, the multiple layers of the 2D grid being separated by vertical edges each representing a time step between repeated measurements of the nodes within the 2D grid.

12. The method of claim 10, wherein determining the minimum weight solution further comprises:

using the computed set of soft edge weights as edge weights for corresponding vertical edges of the decoding graph.

13. The method of claim 10, wherein determining the minimum weight solution further comprises:

deriving edge weights for vertical edges of the decoding graph, each of the edge weights being based on a soft edge weight of the computed soft edge weights and a further based on a computed hard edge weight.

14. The method of claim 10, wherein determining the minimum weight solution further comprises:

building a distance graph with at least one of a union find (UF) decoder and a minimum weight perfect matching (MWPM) decoder.

15. One or more non-transitory computer-readable storage media encoding computer executable instructions for executing a computer process comprising:

receiving multiple rounds of a syndrome measurement output by a quantum measurement circuit, the syndrome measurement including a soft value measured for each bit of a plurality of bits in a quantum circuit, the soft value measured for each of the bits being either of a first range corresponding to a hard outcome indicative of non-detection of a fault at a corresponding circuit location or of a second range corresponding to a hard outcome indicative of at least one fault detected at the corresponding circuit location;

computing soft information based on the soft values for each of the bits, the soft information indicating a confidence in the hard outcome associated with the bit and also quantifying an effect of soft noise on the multiple rounds of a syndrome measurement output by a quantum measurement circuit, the soft noise introducing variability in repeated measurements of ancilla qubits due to at least one of limited measurement time and imperfections in a readout device; and identifying fault locations within the quantum measurement circuit based on the computed soft information, the identified fault locations collectively explaining the syndrome measurement output, the soft information biasing a decoding unit toward selecting solution sets including fault locations that correspond to a subset of the bits characterized by low-confidence hard outcomes in the syndrome measurement.

16. The one or more non-transitory computer-readable storage media of claim 15, wherein the computer process further comprises:

receiving, from the quantum measurement circuit, multiple rounds of a soft outcome vector, the soft outcome vector containing real number values representing measurements of a plurality of syndrome bits providing soft information about errors affecting a quantum measurement;

generating a decoding graph defining nodes corresponding to the plurality of syndrome bits, the nodes being connected to one another by horizontal edges and vertical edges; and computing a set of soft edge weights, each of the soft edge weights corresponding to one of the vertical edges in the decoding graph and being based on real number measurement values of a syndrome bit corresponding to endpoints of the vertical edge.

17. The one or more non-transitory computer-readable storage media of claim 15, wherein identifying the fault locations further comprises:

determining a minimum weight solution for a decoding graph based on the computed soft information.

18. The one or more non-transitory computer-readable storage media of claim 17, wherein determining the minimum weight solution further comprises:

using the computed set of soft edge weights as edge weights for corresponding vertical edges of the decoding graph.

19. The one or more non-transitory computer-readable storage media of claim 17, wherein determining the minimum weight solution further comprises:

deriving edge weights for vertical edges of the decoding graph, each of the edge weights being based on a soft edge weight of the computed soft edge weights and further based on a computed hard edge weight computed.

20. The one or more non-transitory computer-readable storage media of claim 17, wherein determining the minimum weight solution further comprises:

employing at least one of a union find (UF) decoder and a minimum weight perfect matching (MWPM) decoder to build a distance graph.

* * * * *